S. M. LAWHUN.
MOVING PICTURE CAMERA.
APPLICATION FILED MAY 23, 1918.
1,302,388.
Patented Apr. 29, 1919.
4 SHEETS—SHEET 1.
Fig. 1.
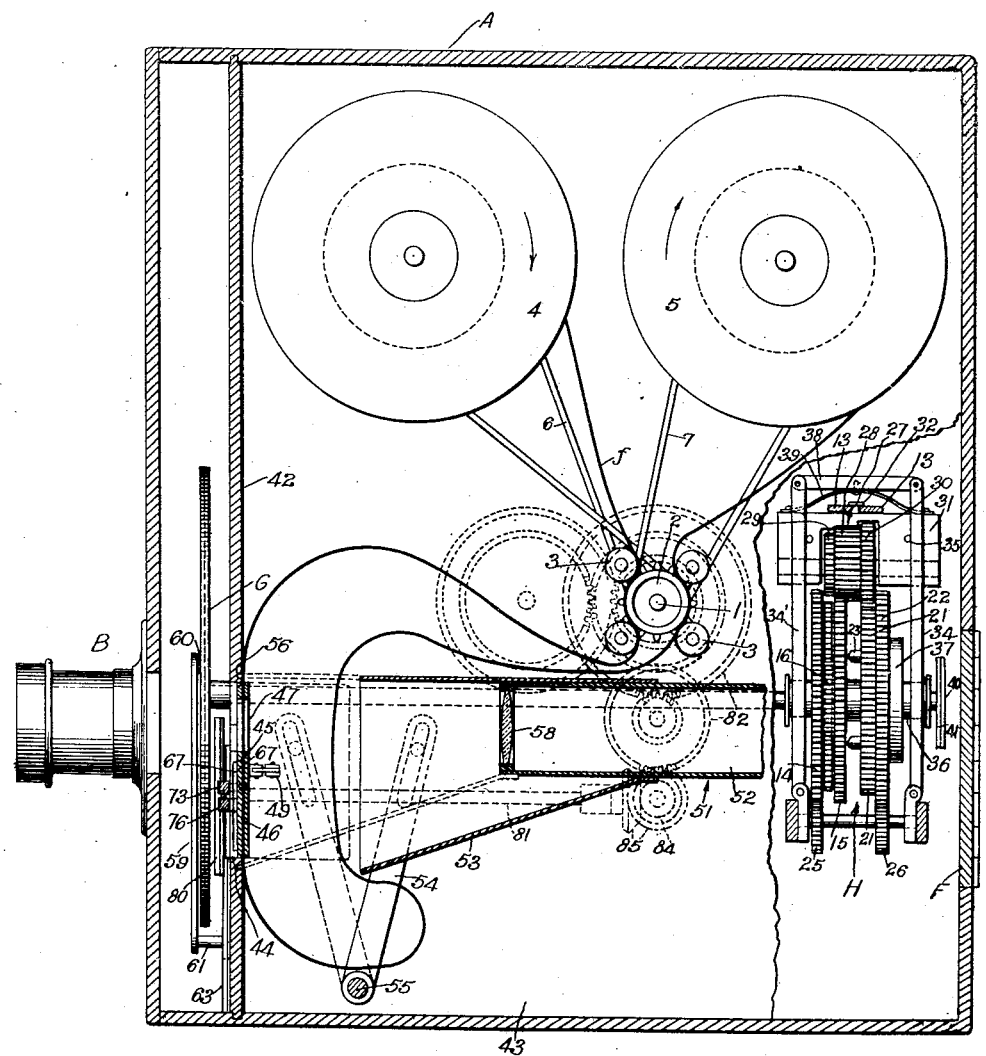
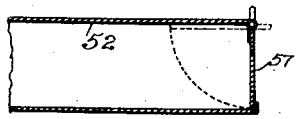
Fig. 2.
WITNESSES
INVENTOR
S. M. Lawhun
BY
ATTORNEYS

S. M. LAWHUN.
MOVING PICTURE CAMERA.
APPLICATION FILED MAY 23, 1918.

1,302,388.

Patented Apr. 29, 1919.
4 SHEETS—SHEET 2.

WITNESSES
Geo. N. Naylor
C. Bradway

INVENTOR
S. M. Lawhun
BY
ATTORNEYS

S. M. LAWHUN.
MOVING PICTURE CAMERA.
APPLICATION FILED MAY 23, 1918.

1,302,388.

Patented Apr. 29, 1919.
4 SHEETS—SHEET 3.

WITNESSES

INVENTOR
S. M. Lawhun
BY
ATTORNEYS

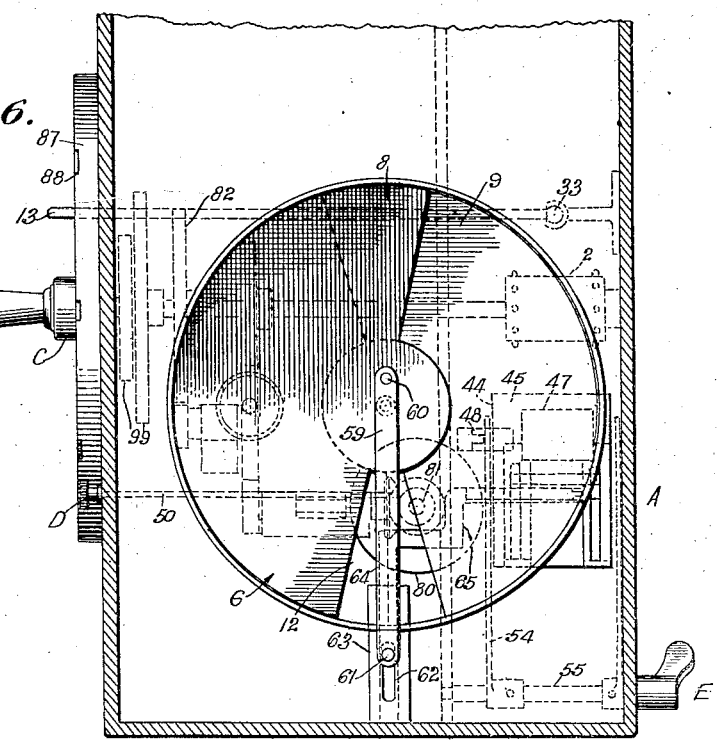

UNITED STATES PATENT OFFICE.

SAMUEL M. LAWHUN, OF JERSEY CITY, NEW JERSEY, ASSIGNOR OF ONE-HALF TO JULIUS L. PERLMAN, OF NEW YORK, N. Y.

MOVING-PICTURE CAMERA.

1,302,388.   Specification of Letters Patent.   Patented Apr. 29, 1919.

Application filed May 23, 1918. Serial No. 236,213.

*To all whom it may concern:*

Be it known that I, SAMUEL M. LAWHUN, a citizen of the United States, and a resident of Jersey City, in the county of Hudson and State of New Jersey, have invented a new and Improved Moving-Picture Camera, of which the following is a full, clear, and exact description.

This invention relates to moving picture cameras, and it has for its general objects to improve the construction and operation so as to be reliable and efficient in use and capable of permitting re-focusing at any time without wasting any portion of the film, permitting adjustment of the shutter opening to produce dissolving or double exposure effects and for taking pictures under different conditions of light intensity or of different rates of motion of objects.

A more specific object of the invention is the provision of a moving picture camera having novel means for registering the opening of the shutter with the lens, removing the film from in line with the lens to an out of way position, and adjusting a sighting tube to position in coöperative relation with the lens, whereby the camera can be refocused without exposing any portion of the film to the light, the parts being restored to normal position after re-focusing, so that pictures can be again taken without any gap or break or any loss of film.

With such and other objects in view, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a vertical section of the apparatus taken through the focusing axis and partly broken away to illustrate the gearing for the shutter adjustment;

Fig. 2 is a sectional view of the rear end of the focusing tube;

Fig. 6 is a transverse vertical section in front of the shutter;

Fig. 7 is a detail sectional view of the film feeder and the apertured door by which the film is thrown to one side of its normal position for focusing purposes;

Fig. 10 is a sectional plan view of the same on the line 10—10 of Fig. 9.

Figure 3:
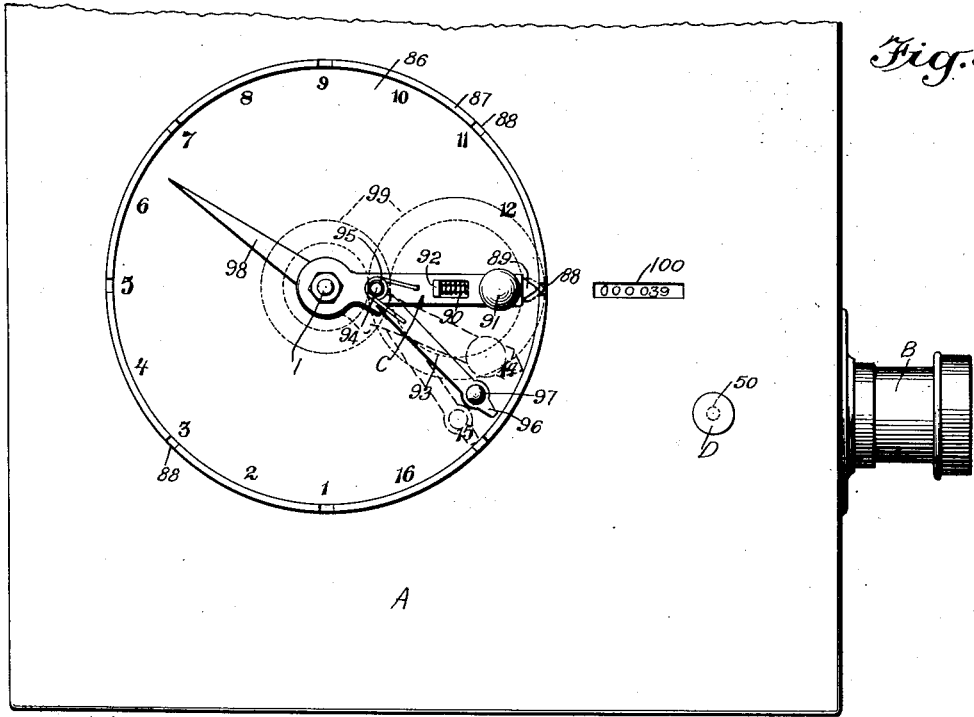
Fig. 3 is an elevation showing the operating crank side of the camera.

Referring to the drawing, A designates the box or casing of the camera which is of any suitable construction and has at its front an ordinary focusing lens B which is of the adjustable type, although the adjusting means is not shown, and at one side of the camera is an operating handle C for actuating the film reels, film feeder and shutter, and on the same side of the box A with the operating handle C is a pull knob D for moving the film out of its normal position to permit focusing of the camera, while on the opposite side of the casing is a handle or lever E for adjusting the focusing tube to its operative position after the film has been thrown to one side, and at the rear of the casing is a door F which is adapted to be opened for the purpose of focusing the camera and for determining the set of the shutter opening.

The operating crank C is rigidly fastened to a horizontal shaft 1 which extends across the box A and has a toothed drum 2, along the front and rear of which passes the film *f*, which is held by idlers 3 in proper relation to the drum and which is carried by the reels 4 and 5 driven by belts 6 and 7, respectively, receiving power from the main shaft 1. Between the loop of the film and the lens is a shutter G which is composed of two sections 8 and 9 secured respectively to a tubular shaft 10 and a solid shaft 11 arranged within the tubular shaft so that by relative rotative adjustment of the two sections the exposure opening 12 of the shutter can be varied to any desired extent and also the dissolving effect can be obtained by the relative movement of the shutter sections.

Figure 5:
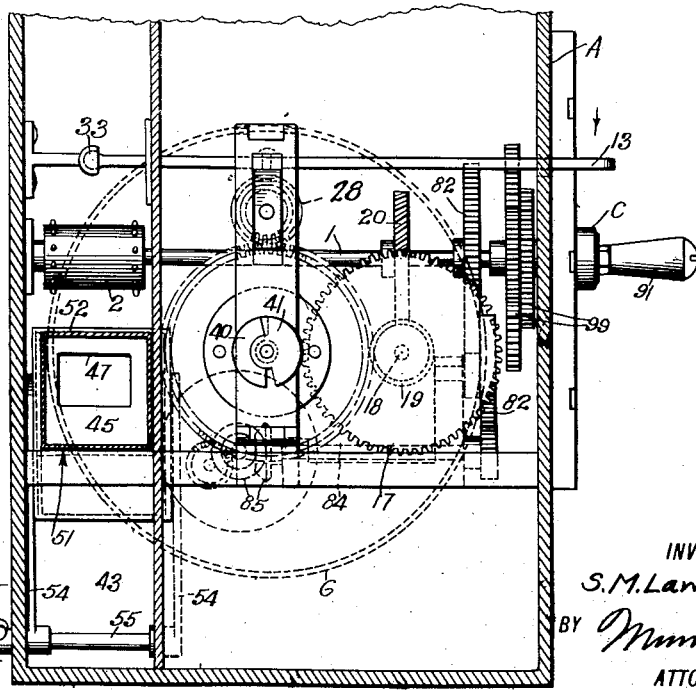
Fig. 5 is a vertical transverse section at the rear portion of the camera.

The adjustment of the shutter sections is brought about through the turning of the operating crank C and by the manipulation of a controlling lever 13 which controls the gearing mechanism H located in the rear of the box. The tubular shaft 10 has a gear wheel 14 fastened thereto and the solid shaft 11 has a gear wheel 15 fastened thereto, which latter has a gear 16 at its hub that permanently meshes with a large gear wheel 17 on a worm shaft 18 which is provided with a skew pinion 19 meshing with a skew gear 20 on the main shaft 1. The solid shaft 11 is thus always driven at a speed fixed with relation to the speed of the main shaft, but the tubular shaft 10 can be varied in speed either above or below the speed of the shaft 11 to increase or decrease the size of the shutter opening. On the shaft 11 are a pair of gear wheels 21 and 22 permanently connected together by clutch pins 23, which latter are adapted to engage in openings 24 in the gear 15. The gears 14 and 22 are permanently connected by connected pinions 25 and 26, so that when the pins 23 are in clutching relation to the gear 15, the two shafts 10—11 are locked together, so that the sections of the shutter rotate in fixed relation to each other, this being the normal operative condition of the parts. When it is desired to change the size of the shutter opening, the clutch pins 23 are unclutched and a sliding gear element 27, Fig. 1, is brought into operation to cause differential rotative speed of the shutter shafts 10 and 11. This shiftable gear element 27 has teeth 28 adapted to engage with the gear 15 in either lateral position of the gear element 27, and also has gear teeth 29 and 30 arranged to engage respectively the gear wheels 14 and 21, according to the direction in which the gear element 27 is shifted. The gear element 27 is carried by a block or equivalent support 31 pivotally connected at 32 with the controlling lever 13, and as the lever has a universal pivot 33, Fig. 5, the outer end of the lever can be moved both up and down and laterally, which movements are necessary to throw the gear element 27 into and out of mesh with the gears 14, 15 and 21. It will be noted that the gears 14 and 21 are of different diameters, so that when either one of these gears is connected with the gear 15 through the shifting gear element 27, the shutter shafts 11 and 12 will rotate at different speeds to cause the shutter sections to increase or decrease the shutter opening. When the shifting element is in the position shown in Fig. 1, the shaft 10 rotates at a higher speed than the shaft 11, and when the gear 29 is meshing with the gear 14 the shaft 10 will rotate at a lower speed than the shaft 11. The lateral motion of the lever 13 operates to throw the clutch pins 23 into and out of clutching position. This is brought about by the lever 34, Fig. 1, which is engaged by a pin 35 on the block 31 and which has a connection at the hub 36 with the disk 37 that carries the clutch pins 23. The lever 34 has a companion lever 34' at the opposite side of the differential shutter gearing H, and the upper ends of the links or levers 34 and 34' are connected by a cross-bar 38, to which is fastened a spring 39 that yieldingly supports the block 31 and holds the same normally in a position for clearing the gear element 27 from the gear wheel 15. To ascertain the set of the shutter sections at any time the rear door F of the box is opened where are exposed two indicating members 40 and 41 which are miniature representations of the shutter sections 8 and 9, and these are normally connected with the shafts 10 and 11.

Figures 8, 9:
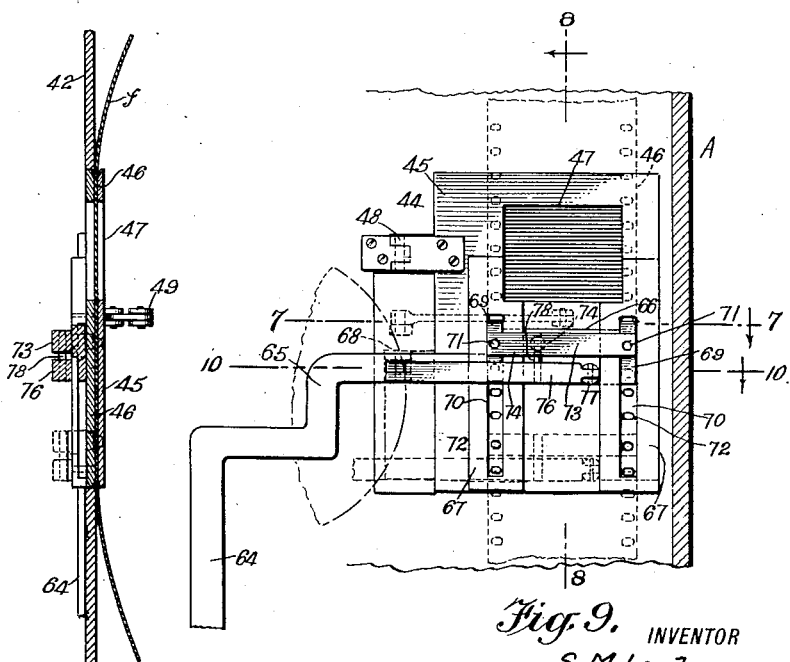
Fig. 8 is a vertical section on the line 8—8, Fig. 9.
Fig. 9 is a front view of the film feeder and apertured door.
Figure 4:
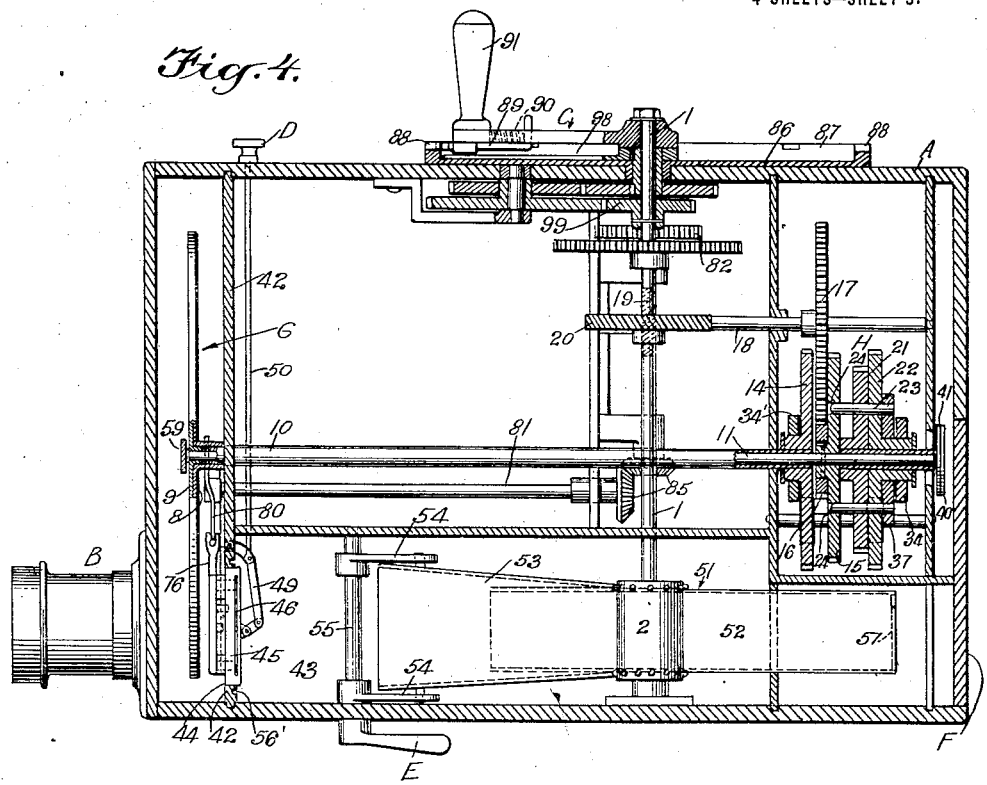
Fig. 4 is a horizontal section taken in the plane of the operating crank shaft and with portions in section at a lower plane.

In the front wall 42 of the film chamber 43, Figs. 4 and 7, is a door opening 44, normally closed by a door 45, which latter has a vertical slot 46 through which the film passes, as shown in Fig. 8, and in the door is an aperture 47 which is in line with the lens B, so that when the opening of the shutter reaches a point between the lens and film an exposure will be made on the latter. The door is adapted to swing on a hinge 48 through approximately ninety degrees to carry the film out of the way when the camera is to be focused. As shown in Fig. 4, a lever 49 is linked to the door, and a rod 50, to which the pull knob D is attached, is connected with the lever for moving the door open or closed. In the film chamber 43 is a focusing tube 51 composed of a fixed rear section 52 and a movable front section 53 telescopically fitted to the rear section, and the front section is pivotally connected to arms 54 on a rock shaft 55 which has the operating handle E. By turning the handle forwardly or to the left, Fig. 4, the front section 53 of the focusing tube moves from the full to the dotted line position, Fig. 1, there being grooves 56 in the wall 42, so as to receive the front edges of the movable section 53 and exclude light from the film when the latter is drawn aside by the swinging open of the door 45. The rear end of the sighting tube has a door 57, Fig. 2, which is adapted to be thrown open after the door F of the camera box is opened. In the sighting tube section 52 is a magnifying lens 58 for magnifying the image in focusing.

The feeding mechanism for the film is operated by the shutter through a connecting rod 59, Fig. 6, which is connected by a crank pin 60 with the section 8 of the shutter, and the lower end of this rod has a pin 61 movable in a slot 62 of a guide 63, said pin being rigidly connected with an upwardly extending bar 64 having an offset arm 65 which extends over to the door 45 and terminates in a plate 66 which slides behind vertical guides 67 fastened to the front side of the door 45, there being in the arm 65 a hinge 68 which is vertically below the hinge 48, so that the plate 66 on the extremity of the arm can swing with the door 45 as it opens and closes. The slide or plate 66 has lugs 69 which enter vertical slots 70 in the guides 67, and passing through apertures in the lugs 69 are pins or teeth 71 which engage in the gear openings 72 of the film, said pins 71 being fastened to a floating bar 73 which moves back and forth toward the film to engage and disengage the pins or teeth with and from the film. The bar 73 has a guide pin 74 which enters a guideway 75 in the slide or plate 66. Below the bar 73 is a lever 76 fulcrumed at 77 on the plate 66, and this lever is connected by a pivot pin 78 with the bar 73, so that as the lever 76 moves back and forth in a horizontal plane the bar 73 will move back and forth with respect to the film. The lever 76 has a bifurcated extremity 79 to span the edge of a cam disk 80 fastened to a shaft 81 which receives motion from the main shaft 1 through a speed multiplying gearing 82 connecting the main shaft with the secondary shaft 84, the latter being connected by bevel gears 85 with the cam shaft 81. By this means the toothed gearing element 73 is moved up and down and back and forth to move the film the length of one picture image section in each cycle of up and down and back and forth movements. It will be noted that the film plate mechanism will always be in coöperative relation with the film, even though the door 45 is moved open, but when the door moves open the bifurcation 79 disengages the cam wheel 80, but as soon as the door closes the engagement is automatically restored.

Extending around the path of the operating crank C is a numbered dial 86 which has a rim 87 provided with spaced notches 88. On the face of the dial are sixteen division marks numbered 1 to 16, which correspond to the number of picture image sections in a foot of film, and the notches 88 are arranged at the odd numbers. On the handle C is a pawl 89 normally retracted by reason of the tension of the spring 90 thereon. When the operator grips the knob 91 of the handle and engages the lug 92 of the pawl, the pawl can be thrown outwardly to the dotted-line position, Fig. 3, to engage in a notch 88, which means that the shutter is in non-exposing position with respect to the film, and when the crank is moved to the next figure, the shutter will have traveled to such a point that the opening thereof will be in line with the film to make an exposure. In other words, the even numbers of the dial represent exposures, and the odd numbers mean non-exposures. When the crank C is in the position shown in Fig. 3, the camera is in condition for permitting focusing or re-focusing, this being done by first pulling on the pull knob D to open the door 45 and move the film to one side, and then operating the lever or handle E to adjust the focusing tube to proper position, as indicated by the dotted lines Fig. 1. The shutter must be moved to bring its opening in line with the lens before the focusing can take place. To facilitate this a stop member 93 is fulcrumed on the crank C at 94 at a point adjacent the shaft 1. A spring 95 operates on the stop member 93 to keep a tooth 96 on the free end of the stop member 93 normally away from the notched rim 87, and on the stop member 93 is a knob 97 which permits the operator to grip the stop member while still holding the knob 91 to draw the stop member into engagement with the rim. While the two knobs are thus held the crank C is moved forwardly until the tooth 96 enters the next notch 88, say opposite the member 15, it being understood that before this engagement takes place the pawl 89 is released. By the stop member 93 engaging the next notch 88 opposite the member 15 it forms a brace for the crank C and hence limits further forward movement thereof, the crank being thus arrested at a position opposite an even number, say the number 14 (see dotted lines in Fig. 3), which corresponds to the open position of the shutter. The camera end door F and the focusing tube door 57 are now open so that the image can be seen, the proper focusing being accomplished by the lens mechanism in the usual manner. After the focus is obtained the parts are restored to normal position so that the film can be exposed by operating the main crank, the stop member 93 being previously released.

Associated with the operating crank C is an indicating needle 98 which is driven at a reduced speed through a train of speed-reducing gears 99, as shown in Fig. 4, so that the indicating needle 98 will make one complete revolution with one foot of travel of the film, and this indicating needle in connection with a counter or meter 100, Fig. 3, will enable double exposure and dissolving work to be easily and accurately accomplished.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. A moving picture camera comprising a film chamber having an opening, a door for the opening having an exposure aperture, a lens in line with the door and aperture, means on the door for engaging the film, means for moving the door to carry the film away from its normal position, and a focusing tube adjustable to the door opening for focusing the camera without exposing the film to light.

2. A moving picture camera comprising a film chamber having an opening, a door for the opening having an exposure aperture, a lens in line with the door and aperture, means on the door for engaging the film, means for moving the door to carry the film away from its normal position, and a focusing tube in the film chamber and having an adjustable section movable to the door opening when the film is at one side of its normal position.

3. A moving picture camera comprising a film chamber having an opening, a door for the opening having an exposure aperture, a lens in line with the door and aperture, means on the door for engaging the film, means for moving the door to carry the film away from its normal position, a focusing tube adjustable to the door opening for focusing the camera without exposing film to light, a shutter, and means for actuating the shutter to bring the opening thereof in line with the lens for focusing the camera.

4. A moving picture camera including a lens, a shutter in coöperative relation thereto, a film supported in normally exposed position, means for moving the film away from exposing position, and a focusing device adjustable into coöperative relation with the shutter and lens when the film is moved from exposing position.

5. A moving picture camera including a lens, a shutter in coöperative relation thereto, a film supported in normally exposed position, means for moving the film away from exposing position, and a focusing tube having a movable section adjustable into coöperative relation with the lens and shutter for focusing the camera when the film is out of its normal position.

6. A moving picture camera comprising a casing, a lens, a shutter, a member engaging the film and movable to remove the film from normal position, a film feeder mounted on the member, means for operating the feeder and adapted to automatically engage and disengage the feeder in the movement of the said member, and a focusing device movable to operative position when the member holds the film out of its normal position.

7. A moving picture camera including a film, a member with which the film engages, a feeder reciprocatory along the path of the film and movable into and out of engagement with the film, whereby the feeder moves the film forwardly step by step, and means for actuating the member to carry the film out of normal position to permit focusing of the camera without spoiling a portion of the film.

8. A moving picture camera including a film chamber having an opening, a swinging door at the opening and provided with an exposure aperture, a film in the chamber, means on the door through which the film slides, means for actuating the door to carry the film out of its normal position to permit focusing of the camera, a reciprocatory element having a hinged section to move with the door, film feeding means carried by the hinged section, and means for operating the film feeding means.

9. A moving picture camera including a film chamber having an opening, a swinging door at the opening and provided with an exposure aperture, a film in the chamber, means on the door through which the film slides, means for actuating the door to carry the film out of its normal position to permit focusing of the camera, a reciprocatory element having a hinged section to move with the door, film feeding means carried by the hinged section, a device for moving the film-feeding means into and out of engagement with the film, said device being movable with the door, and an actuator for the device and automatically engageable with and disengageable from the device by the movement of the door.

10. A moving picture camera including a shutter, a film driving means having a crank, a dial over which the crank turns and which is provided with numbered divisions corresponding to the number of picture sections in a unit length of film, and means at alternate divisions for permitting the crank to be held with the shutter in non-exposing position.

11. A moving picture camera including a shutter, a film driving means having a crank, a dial over which the crank turns and which is provided with numbered divisions corresponding to the number of picture sections in a unit length of film, means at alternate divisions for permitting the crank to be held with the shutter in non-exposing position, and means on the crank for arresting the latter when moved far enough to bring the opening of the shutter in exposing position.

12. A moving picture camera including an operating crank, a dial having division marks corresponding in number to the number of picture sections in a unit length of film, said dial having a rim provided with notches at every other division, a pawl on the crank adapted to be pressed against the rim as the crank moves to engage the notch and arrest the crank, a shutter connected with the crank and having an opening adapted to be in non-exposing position when the crank is arrested by the pawl engaging a notch, and a stop member carried by the crank and adapted to be held against the rim while the crank moves and to enter a notch in the rim for stopping the crank when in exposing position.

13. A moving picture camera including an operating crank, a dial having division marks corresponding in number to the number of picture sections in a unit length of film, said dial having a rim provided with notches at every other division, a pawl on the crank adapted to be pressed against the rim as the crank moves to engage the notch and arrest the crank, a shutter connected with the crank and having an opening adapted to be in non-exposing position when the crank is arrested by the pawl engaging a notch, a stop member carried by the crank and adapted to be held against the rim while the crank moves and to enter a notch in the rim for stopping the crank when in exposing position, and a spring acting on the stop member to normally hold the same away from the rim.

14. A moving picture camera including an operating crank, a dial having division marks corresponding in number to the number of picture sections in a unit length of film, said dial having a rim provided with notches at every other division, a pawl on the crank adapted to be pressed against the rim as the crank moves to engage the notch and arrest the crank, a shutter connected with the crank and having an opening adapted to be in non-exposing position when the crank is arrested by the pawl engaging a notch, a stop member carried by the crank and adapted to be held against the rim while the crank moves and to enter a notch in the rim for stopping the crank when in exposing position, an indicator movable over the dial, and a reducing gear between the crank and indicator.

15. A moving picture camera comprising an operating crank, a dial over which the crank moves and having numbered divisions corresponding in number to the number of picture sections in a unit length of film, and an indicating finger geared to the crank and movable over the dial, the said indicating finger moving over one of the said divisions on a complete revolution of the said crank.

SAMUEL M. LAWHUN.